United States Patent [19]

Tanaka et al.

[11] 4,191,869

[45] Mar. 4, 1980

[54] VIBRATION DETECTOR DEVICE

[75] Inventors: Katsufusa Tanaka; Isamu Tanakura, both of Amagasaki, Japan

[73] Assignee: Mitsubishi Denki Kabushiki Kaisha, Tokyo, Japan

[21] Appl. No.: 924,827

[22] Filed: Jul. 14, 1978

[30] Foreign Application Priority Data

Jul. 19, 1977 [JP] Japan ................................ 52-86802

[51] Int. Cl.[2] ...................... G01P 15/02; H01H 35/14

[52] U.S. Cl. ................................ 200/61.45 R; 73/514; 200/61.53; 340/683

[58] Field of Search ........................ 116/114 AH, 203; 200/61.53, 61.45 R; 361/35; 340/566, 683

[56] References Cited

U.S. PATENT DOCUMENTS

| | | | |
|---|---|---|---|
| 2,509,667 | 5/1950 | Ballinger | 340/566 X |
| 2,619,605 | 11/1952 | Lancor, Jr. | 340/683 X |
| 2,930,863 | 3/1960 | Pasieka | 200/61.53 |
| 2,993,100 | 7/1961 | Maeder | 200/61.53 |
| 3,623,449 | 11/1971 | Knutson | 116/114 AH |

*Primary Examiner*—Daniel M. Yasich

*Attorney, Agent, or Firm*—Wenderoth, Lind & Ponack

[57] ABSTRACT

A cylindrical movable member is forcedly fitted into two spaced annular leaf springs and disposed within a main detector body on its longitudinal axis with the lower end of the movable member put in point contact with the bottom of the main body. The leaf springs have outer peripheries fixed to the peripheral wall of the main body. The upper end of the movable member faces an operating rod for a limit switch having a spacing between them.

4 Claims, 3 Drawing Figures

VIBRATION DETECTOR DEVICE

BACKGROUND OF THE INVENTION

This invention relates to a vibration detector device for mechanically detecting vibrational energy from equipment and issuing a signal in response to vibration in excess of a predetermined level.

In gas insulated electric equipment including electrical appliances disposed, for example, in a tank filled with an electrically insulating gas, unexpected explosive accidents such as an electric discharge within the tank may occur but the results thereof cannot be externally observed. Accordingly, there have previously been objections to electric equipment including a multitude of tanks because it is difficult to sense positions where trouble or faults have occurred and it is necessary to open the tanks to observe the interior thereof for maintenance and inspection and so on.

It is desirable to provide vibration detector devices particularly suitable for detecting trouble or faults of such electric equipment. Where the fault or trouble occurs in electrical appliances, transformer substations, power plants etc, vibrations with high amplitudes are immediately occur on a specified part thereof. Therefore, by detecting the resulting vibrational energy, the position of occurrence of the fault can be rapidly detected and it is possible to prevent both the spread of the fault and the occurrence of secondary failures.

Accordingly, it is an object of the present invention to provide a new and improved vibration detector device for mechanically detecting vibration of equipment with a simple, inexpensive construction thereby, for example, rapidly sensing a fault occurring in electrical appliances disposed in a tank.

SUMMARY OF THE INVENTION

The present invention provides a vibration detector device comprising a monitored appliance, the main body of the detector device secured to the monitored appliance, a leaf spring fixedly secured to the main body of the detector device, a movable member supported by the leaf spring movable in a predetermined direction, the leaf spring abutting the movable member to form an angle therebetween for moving the movable member in the predetermined direction in response to vibration generated by the monitored appliance, and means responsive to the movement of the movable member to a predetermined position for issuing a signal.

In a preferred embodiment of the present invention, the movable member is in the form of a circular cylinder with the predetermined direction along the longitudinal axis thereof, the leaf spring is annular and includes a plurality of radial grooves extending from the inside perimeter thereof toward the outside perimeter thereof having predetermined equal lengths, the outside of the movable member and the inside of the leaf spring have a small difference in diameter therebetween so that the two minutely overlap each other, and the movable member is fitted into the leaf spring to impart an angle to the leaf spring.

In order to apply a high driving force to the movable member at the beginning of the movement thereof, the rear end surface of the movable member as viewed according to the predetermined direction of movement thereof may abut the main body of the detector device or the detected appliance.

In order to avoid a fear that the movable member may be tilted by an impact force applied directly to the same from the main body of the detector device and also to ensure reliable operation, one end of the movable member may be put in point contact with the main body of the detection device on substantially the longitudinal axis of the movable member.

BRIEF DESCRIPTION OF THE DRAWING

The present invention will become more readily apparent from the following detailed description taken in conjunction with the accompanying drawings in which.

DESCRIPTION OF THE PREFERRED EMBODIMENT

Figure 1:
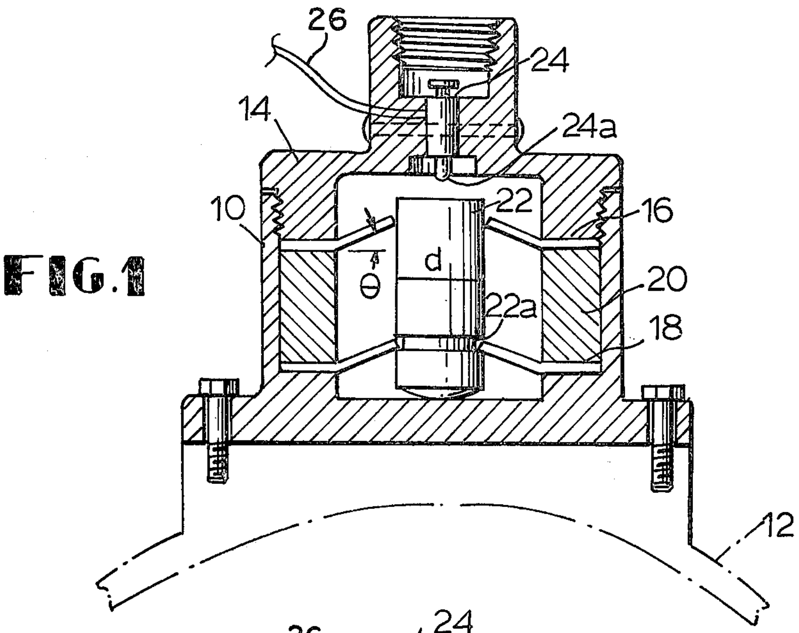
FIG. 1 is a longitudinal sectional view of one embodiment of the vibration detector device according to the present invention illustrated in its cocked position.

Referring now to FIG. 1 of the drawings, there is illustrated a vibration detector device according to the present invention, in its cocked position, that is, before vibration is detected. The arrangement illustrated comprises a main detector body 10 including an upper portion in the form of a hollow circular cylinder and a lower portion mounted to an outer wall of a tank 12 for detection of the vibration generated thereby. A cover member 14 is screw threaded into the open end of the upper portion of the main detector body 10 to form a hollow cylindrical space therebetween and to fix a pair of similar annular leaf springs 16 and 18 with an annular spaces 20 interposed therebetween between the bottom of main detector body 10 and the cover member 14.

A movable member 22 in the form of a circular cylinder is retained within the cylindrical space defined by the main detector body 10 and the cover member 14 on the longitudinal axis thereof by the pair of annular leaf springs 16 and 18 through which the movable member 22 extends. The movable member 22 has its lower end surface as viewed in FIG. 1 contacting the bottom of the main detector body 10. The movable member 22 has an outside diameter d (see FIG. 1) slightly greater than the inside diameter D (see FIG. 2) of the annular leaf spring 16 or 18. As shown in FIG. 1, the lower end surface of the movable member 22 is formed into a substantially conical surface which is put in point contact with the bottom of the main detector body 10 on the longitudinal axis of the cylindrical space as above described.

The movable member 22 is first put within the main detector body 10 on the longitudinal axis thereof by placing the lower end surface against the bottom thereof. Then the annular leaf spring 18, the spacer 20 and the annular leaf spring 16 are inserted into the main detector body 10 in the named order while the movable member 22 is forcedly fitted into the central holes of the leaf springs 16 and 18. Thereafter the cover member 14 is screw threaded into the upper end portion of the main detector body 10 to fasten the leaf springs 16 and 18 and the spacer 20 to the main detector body 10.

Because the outside diameter of the movable member 22 is slightly greater than and the inside diameter of the leaf springs 16 and 18 as above described, that portion of each leaf spring 16 or 18 extending into the interior of the main detector body 10 is tilted upward as viewed in FIG. 1 to form a truncated cone. Note that the lower leaf spring 18 has its inside perimeter abutting a circumferential groove 22*a* disposed on the lower portion of the movable member 22. Therefore the leaf springs 16 and 18 serve to support the movable member 22 for upward longitudinal movement while at the same time, the lower end surface of the movable member 22 abuts the bottom of the main detector body 10 in a stabilized state. Also the spacer 20 serves to maintain predetermined spacing between the leaf springs 16 and 18 and to permit the movable member 22 to advance in the predetermined direction even if the main detector body 10 and movable member 22 were disposed horizontally.

As shown in FIG. 1, the cover member 14 includes a central portion extending upward and a limit switch 24 secured in the upper central portion for example, by riveting. The limit switch includes an operating rod 24*a* opposing the upper flat end surface of the movable member 22 having a predetermined spacing therebetween.

Figure 2:
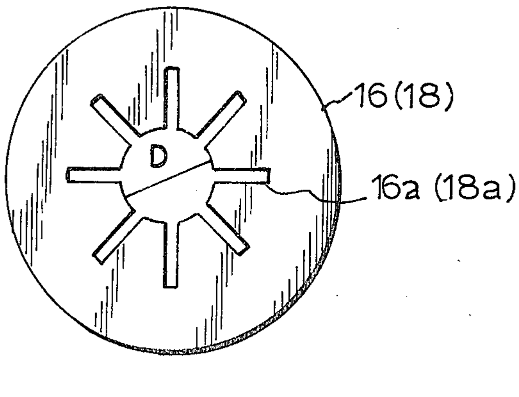
FIG. 2 is a plan view of the leaf spring shown in FIG. 1.

In order to make it easy to forcedly fit the movable member 22 into the leaf spring 16, the latter includes a plurality slots 16*a* extending from the inside perimeter toward the outside perimeter thereof at equal angular intervals and for equal predetermined lengths. Eight slots 16*a* are shown in FIG. 2. Leaf spring 18 also includes a plurality of slots 18*a* for a similar purpose as indicated by the parenthetical labels in FIG. 2.

The operation of the arrangement shown in FIGS. 1 and 2 will now be described. Assuming that an accident such as an explosion due to a shortcircuit occurs within the tank 12, the resulting energy instantaneously vibrates the outer wall of tank 12 at a high frequency with a high acceleration. This mechanical vibration causes the detector device mounted to the outer wall of the tank 12 to vibrate. As that time an initial acceleration directed upward as viewed in FIG. 1 applies an impact force to the interface between the movable member 22 and the main detector body 10 to push up the movable member 22 until the inside perimeter of the lower leaf spring 18 disengages from the groove 22*a* on the movable member 22. On the other hand, the movable member 22 tends to still move upward due to its inertia. Following this a downward directed excrusion of the vibration tends to push down the movable member 22 through the frictional force developed between the latter and the leaf springs 16 and 18. However, the leaf springs 16 and 18 are designed and constructed so that the frictional force at that time is less than the inertia of the movable member 22. This results in a slip occurring at the interface between the movable member 22 and the leaf springs 16 and 18. This means that the surface portion of the movable member 22 abutting each leaf spring 16 or 18 is lowered down the movable member 22 during the lower limit of the downward directed excursion of the vibration. The next succeeding upward directed excursion of the vibration causes the inside perimeter of the leaf springs 16 and 18 to bite into the movable member 22 because that portion of each leaf spring 16 and 18 located adjacent to the movable member 22 forms a truncated cone surface tilted at an angle $\theta$ to a plane normal to the longitudinal axis of the movable member 22 as shown in FIG. 1. Accordingly, only the upward directed excursions of the vibration move the movable member 22.

Figure 3:
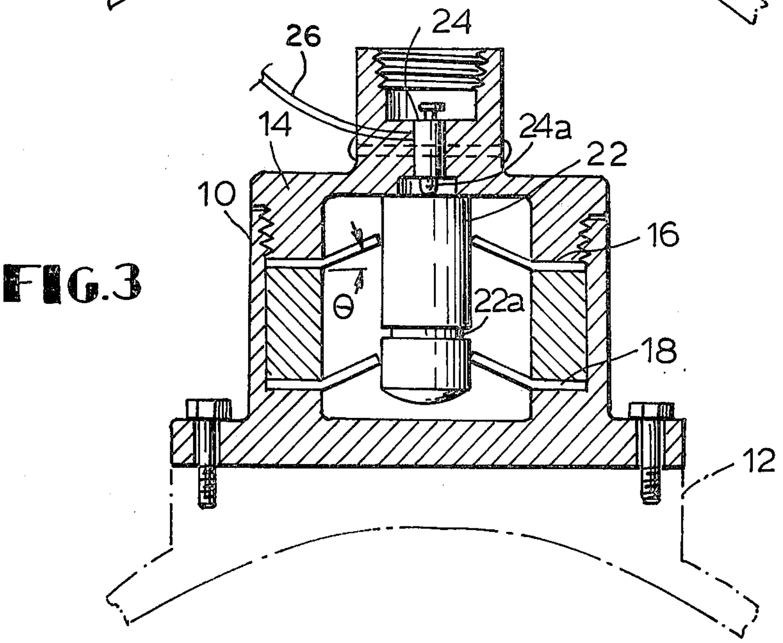
FIG. 3 is a view similar to FIG. 1 but illustrating the status after the detection of vibration.

The process as above described is repeated to raise the movable member 22 until the upper end flat surface of the movable member 22 abuts the lower surface of the cover member 14 thus pushing the operating rod 24*a* upward as shown in FIG. 3. Therefore the limit switch 24 is operated to generate a signal indicating the detection of the fault. Limit switch 24 may be, for example, an electrical switch which is closed in conjunction with the upward movement of operating rod 24*a* to produce an electrical signal on lines 26. However, limit switch 24 may comprise any mechanical and/or electrical means for indicating that movable member 22 has actuated operating rod 24*a*.

As above described, the movable member 22 is vibrated by receiving an impact force from the bottom of the main detector body 10 at the beginning of the vibration developed on the outer wall of the tank 12. Under these circumstances, the direction of vibration may be tilted relative to the longitudinal axis of the movable member 22. Even in this event, there is no fear that the movable member 22 may be relative to the longitudinal axis of the cylindrical space defined by the main detector body 10 and the cover member 14. This is because the movable member 22 has its lower end surface substantially in point contact with the bottom of the main detector body 10 on the longitudinal axis. This prevents nonuniform contact pressures developed between the movable member and the leaf spring resulting in a stabilized operation of the movable member. Therefore the limit switch has less deviation in its operating time less in deviation resulting in high reliability.

From the foregoing it is seen that the present invention has a simple construction in which the movable member abuts the annular leaf spring forming a pedetermined angle therebetween. By proper control the dimensions and the resilience of the leaf spring and the dimensions and mass of the movable member, it is possible to stably detect the mechanical energy of vibrations within limits and also to store an indication of their magnitude.

While the present invention has been illustrated and described in conjunction with a single preferred embodiment thereof it is to be understood that numerous changes and modifications may be resorted to without departing from the spirit and scope of the present invention. For example, while the present invention has been described in conjunction with the detection of a fault of an electrical appliance, it is to be understood that the same is equally applicable not only to the detection of general accidents but also to accelerometers by controlling the dimensions and resilience of the leaf spring and the mass of the movable member to the required magnitudes. Further it is possible to measure degrees of vibration by measuring the amount of movement of the movable member.

What we claim is:

1. A vibration detector device for detecting vibration in an appliance comprising:

a main detector body for mounting on the appliance whose vibration is to be detected;

a movable member movable in response to vibration of said appliance;

at least one leaf spring, having a first portion secured to said main detector body and a second portion abutting said movable member at an angle other than a right angle, for supporting said movable member, for permitting said movable member to move in a first direction which tends to cause said abutting angle to further depart from a right angle by sliding the portion of said movable member abutting said second portion of said leaf spring away from said leaf spring, and for preventing said movable member from moving in a second direction, opposite to said first direction, which tends to cause said abutting angle to approach a right angle by friction between said second portion of said leaf spring and said movable member; and a limit switch arranged to actuate means for generating a signal when said movable member moves a predetermined amount in said first direction so as to contact the limit switch.

2. A vibration detector device as claimed in claim 1 wherein:

said leaf spring has an annular shape, the outside periphery thereof constituting said first portion and the inside periphery constituting said second portion, including a plurality of radial grooves having predetermined equal lengths extending from said inside periphery toward said outside periphery; and said movable member has a cylindrical shape having an outside diameter slightly greater than the inside diameter of said inside periphery of said leaf spring, said movable member being fitted into said inside periphery of said leaf spring thereby imparting said angle to said leaf spring.

3. A vibration detector device as claimed in claim 1 wherein the rear end surface of said movable member as viewed according to said first direction abuts one of either said main detector body and said appliance.

4. A vibration detector device as claimed in claim 3 wherein said rear end surface of said movable member is placed in point contact with said main detector body on substantially the longitudinal axis of said movable body.

* * * * *